US008526935B2

(12) United States Patent
Besore et al.

(10) Patent No.: US 8,526,935 B2
(45) Date of Patent: Sep. 3, 2013

(54) APPLIANCE DEMAND RESPONSE ANTENNA DESIGN FOR IMPROVED GAIN WITHIN THE HOME APPLIANCE NETWORK

(75) Inventors: John K. Besore, Prospect, KY (US); Jackson Wang, Toronto (CA); Timothy Worthington, Crestwood, KY (US)

(73) Assignee: General Electric Company, Schenectady, NY (US)

( * ) Notice: Subject to any disclaimer, the term of this patent is extended or adjusted under 35 U.S.C. 154(b) by 815 days.

(21) Appl. No.: 12/637,917

(22) Filed: Dec. 15, 2009

(65) Prior Publication Data

US 2011/0140972 A1 Jun. 16, 2011

(51) Int. Cl.
*H04M 3/00* (2006.01)

(52) U.S. Cl.
USPC .......................................... 455/420; 455/66.1

(58) Field of Classification Search
USPC ....... 455/66.1, 90.3, 418, 419, 420; 343/702; 340/12.29
See application file for complete search history.

(56) References Cited

U.S. PATENT DOCUMENTS

| | | | | |
|---|---|---|---|---|
| 5,798,688 | A * | 8/1998 | Schofield | 340/438 |
| 6,252,883 | B1 * | 6/2001 | Schweickart et al. | 370/441 |
| 7,437,150 | B1 * | 10/2008 | Morelli et al. | 455/420 |
| 7,834,816 | B2 * | 11/2010 | Marino et al. | 343/867 |
| 7,965,174 | B2 * | 6/2011 | Wong et al. | 340/286.02 |
| 8,174,381 | B2 * | 5/2012 | Imes et al. | 340/539.23 |
| 8,239,073 | B2 * | 8/2012 | Fausak et al. | 700/295 |
| 2001/0055965 | A1 * | 12/2001 | Delp et al. | 455/420 |
| 2004/0085190 | A1 * | 5/2004 | Tuttle et al. | 340/10.1 |
| 2007/0135973 | A1 * | 6/2007 | Petite | 700/295 |
| 2008/0143550 | A1 * | 6/2008 | Ebrom et al. | 340/825.69 |
| 2009/0011922 | A1 * | 1/2009 | de Rochemont | 501/137 |
| 2009/0132070 | A1 * | 5/2009 | Ebrom et al. | 700/90 |
| 2010/0090806 | A1 * | 4/2010 | Schork et al. | 340/10.4 |
| 2010/0121499 | A1 * | 5/2010 | Besore et al. | 700/295 |
| 2011/0140906 | A1 * | 6/2011 | Kobraei et al. | 340/815.45 |

* cited by examiner

*Primary Examiner* — Lewis West
(74) *Attorney, Agent, or Firm* — Global Patent Operation

(57) ABSTRACT

A home appliance antenna assembly is integrated into the home appliance and extends from a demand response module or the appliance microprocessor where the module is integrated into the appliance. At least a portion of the antenna is preferably located adjacent an external surface of the home appliance and adapted for radio frequency (RF) communication. If an external demand supply module is wired to the home appliance, a conventional connection cable typically includes a spare wire that is not used and can thereby serve as a long wire antenna. In other appliances where the module is integrated into the appliance, an antenna is incorporated into the appliance in a utilitarian, but aesthetically unobtrusive manner.

21 Claims, 3 Drawing Sheets

APPLIANCE DEMAND RESPONSE ANTENNA DESIGN FOR IMPROVED GAIN WITHIN THE HOME APPLIANCE NETWORK

BACKGROUND OF THE DISCLOSURE

The present disclosure relates to an appliance or a group or line of home appliances that are adapted to respond to a demand response signal from a utility and initiate a load shedding event in the appliance. More particularly, the disclosure is directed to an improved antenna design that provides optimal gain in order to effectively receive the demand response signal.

A module is typically located outside of the appliance and is adapted to receive the signal from the utility, home energy manager, or the like, and communicate with a controller or microcontroller in the appliance. Further development of the module will eventually incorporate or integrate the module into the home appliance. The module acts as an interface with the appliance in order to relay the demand response signal to the appliance microcontroller. Present systems use either a pigtail or a printed circuit board (PCB) antenna that resides within the module. If the antenna is inadequate, the load shed signal will not be recognized or will go unnoticed regardless of the signal strength of the transmitting system.

Built into the module is a radio that receives the transmission from the head end or meter (and from an equivalent device such as a neighborhood transmitter, home energy manager, gateway, etc.), that receives the signal from the utility and transfers the data to the individual module(s) associated with one or more appliances or other end point devices. Other end point devices include, for example, a thermostat that controls a HVAC system, pool pumps, valves, load switches, televisions, etc. which include a transceiver/receiver/emitter radio incorporated therein. The preferred communication protocol is either 900 MHz, 2.4 GHz, or in the FM broadcast band or a radio digital signal (RDS), although other frequencies can be used with equal success. One issue is the ability of the receiving device to consistently receive the signal from the head end when the module or receiver is surrounded by an appliance(s), walls, etc. that exist in residences. Two options for improving reception in the radio are, first, transmitting more power or, second, improving gain in the antenna and pre-amplifier sections.

Because the module is made to be as small as possible, printed circuit board (PCB) antennas are typically used due to their compact size. However, the decibel gain of these PCB antennas is limited. This, in turn, contributes to poor reception. The power of the transmitter, on the other hand, is sometimes limited by Federal Communication Commission rules, power consumption, cost control, and interference with other RF devices. Therefore, adding power at the transmission end is not as simple as one might anticipate and therefore cannot necessarily be relied upon as the solution to the poor reception problem.

Employing an external antenna to improve reception requires the designer to evaluate physical size and aesthetics. Moreover, if the receiver is internalized to the appliance, the appliance will need to incorporate an antenna design at a location that will provide optimal gain in order to effectively receive the demand response signal. Still further, the physical antenna shapes and lengths must be accommodated over a wide range of home appliances, for example, a refrigerator, range, microwave oven, laundry product (e.g., clothes washer or dryer), dishwasher, hot water heater, window air conditioner, etc. Accordingly, a need exists for effective antenna designs that do not add undue cost, and likewise do not adversely impact the aesthetics of the home appliance.

SUMMARY OF THE DISCLOSURE

A home appliance antenna assembly communicating between a home energy manager and an associated appliance controller/microcontroller includes a home appliance, a microprocessor integral to the appliance for controlling the appliance, a demand response module operatively connected to the home appliance microprocessor, a radio integrated into one of the appliance microprocessor and the demand response module, and an antenna integrated into the home appliance and extending from one of the demand response module and the appliance microprocessor. At least a portion of the antenna is located adjacent an external surface of the home appliance adapted for RF communication with the home energy manager, gateway, local FM radio station transmitter, or other "head end" transmitter of any frequency.

The assembly further includes a tuning circuit network operatively associated with the radio to optimally couple the antenna to the radio.

The demand response module further includes an indicator that exhibits relative strength of an incoming radio signal, and further indicates receipt of valid authenticated packets of data.

In one arrangement, a multi-wire cable interconnecting the home appliance with the demand response module includes a spare wire that is used as the antenna for the radio.

The antenna is incorporated into one of a number of locations, including a wall panel of the home appliance, one of a hinge and hinge cover of the home appliance, along an external surface of the home appliance, a grill of the home appliance, a backsplash, a handle, a decorative overlay, an insulation blanket, within or onto a window of the appliance, as a part of a conducting material applied to an outer surface of the appliance, a conductive paint, etc.

The antenna is preferably an array of driven and parasitic elements to provide directionality, and more specifically are director and reflector elements, respectively.

A method of communicating between the home appliance and the home energy manager includes providing a demand response module, providing a controller/microcontroller for the home appliance that communicates with the demand response module, mounting an antenna adjacent an external surface or component of the home appliance, and connecting the antenna to a radio residing either within the demand response module or incorporated directly in a controller of the home appliance.

A primary benefit is improved wireless reception incorporated into the home appliance.

Another benefit is associated with the incorporation of the antenna into the aesthetics of the home appliance.

Still other features and benefits of the disclosure will become more apparent upon reading and understanding the following detailed description.

DETAILED DESCRIPTION OF THE PREFERRED EMBODIMENTS

Figure 1:
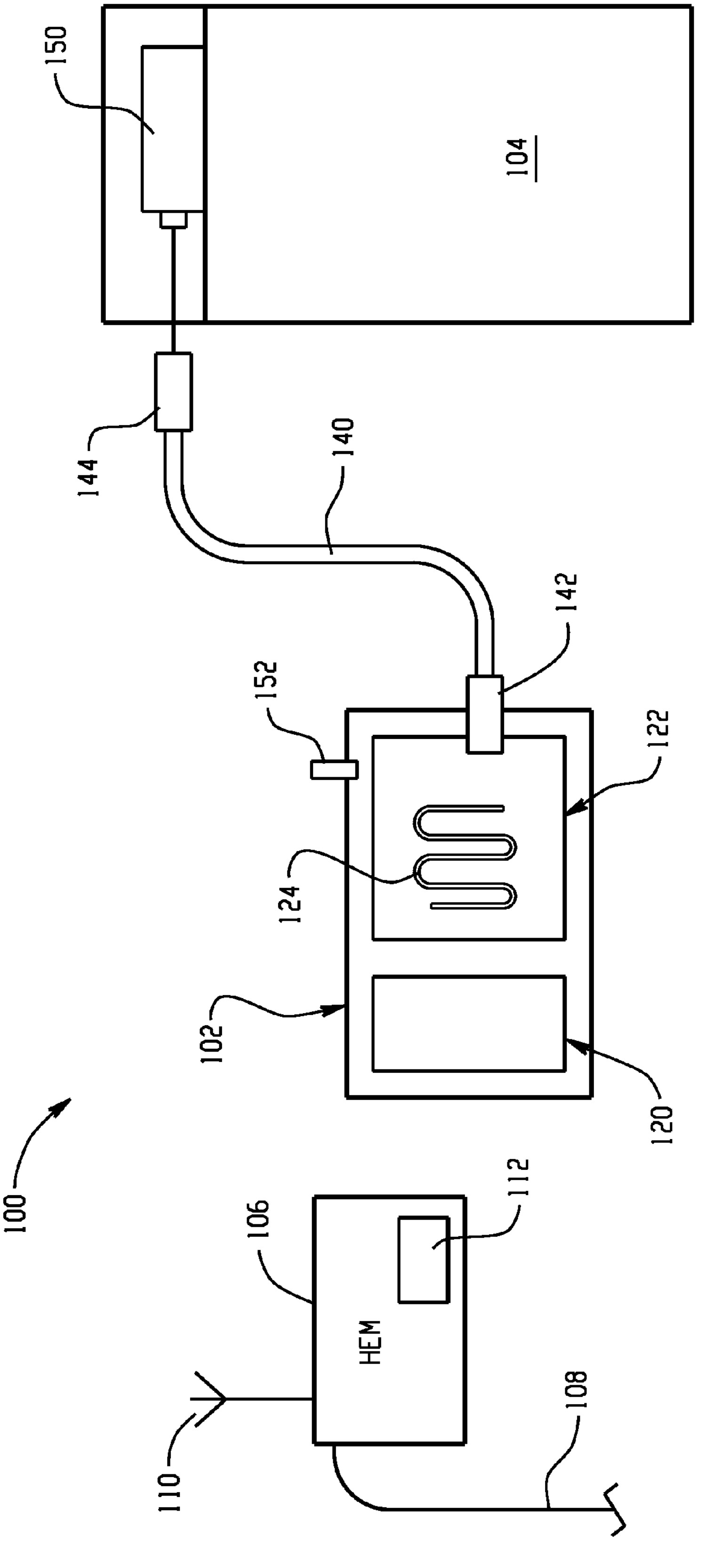
FIG. 1 is schematic representation of an appliance with an external demand supply module hardwired thereto.

Shown in FIG. 1 is a demand supply system 100 that includes a demand supply module 102 that is hardwired to a home appliance 104 in this embodiment. A signal originally supplied by a utility provides an indication of the demand associated with that utility (electric, gas, water, etc.) and when demand is high, costs are correspondingly high, and in some instances load shedding will be prompted or initiated. Whether a homeowner chooses to alter the operation of one or more appliances within the home can be preprogrammed into a networked arrangement or selected by the homeowner in response to a prompt. In a networked arrangement, a home computer or other microprocessor/controller may be included in the system with a user interface allowing the homeowner to program or select programmed actions and operations in response to various signals, or to be prompted in response to such signals. For example, the signal from a utility, neighborhood association, etc. provides data to a home energy manager 106. The data may be received through a wired connection or wirelessly, as represented by line 108 or antenna 110. In turn, a user interface 112 allows the homeowner to preprogram selected responses to be taken by one or more of the appliances remotely located in the home. For example, if a "critical" signal is sent by the utility, the home energy manager 106 convey that information to one or more modules or demand supply management (DSM) modules 102 situated about the home. This network connection could be sent wirelessly or via a wired connection to the individual DSM modules Likewise, although in many instances each home appliance will have its own DSM module, there may be instances where physically adjacent home appliances may use a common module. For example, a clothes washer and dryer that are located adjacent one another in the laundry may receive data from the same DSM module. Likewise, one or more appliances in a kitchen could share a DSM module. However, it is also contemplated that each home appliance has its own respective DSM module with which it communicates, or some combination of individual and shared DSM modules.

In the embodiment of FIG. 1, module 102 includes a printed circuit board 120 that has a microprocessor, microcontroller, or controller. Operatively communicating with the PC or gateway board 120 is a radio 122. As will become more apparent below, the radio can be a transmitter, receiver, or transceiver. The radio includes an internal antenna. A printed circuit board (PCB) antenna is commonly used. The PCB antenna is desirable due to its compactness. However, the decibel gain of these types of antennas is limited which contributes to potentially poor reception. In an effort to improve reception, either more power needs to be transmitted or the gain must be improved in the antenna and preamp sections. Here, the power of the transmitters is limited by FCC rules, power consumption, and cost control. Improving the PCB antenna is particularly difficult and thus leads to employing an external antenna where physical size and aesthetics become potential issues.

Where a DSM module 102 is connected to an appliance 104, the present disclosure uses a spare wire in a connection cable, for example a CATS cable, where the spare wire extending between the DSM module and the appliance can serve as an external antenna. Thus, connection cable 140 is operatively connected to the module in typical fashion, for example with an RJ45 module connector or similar connector 142, and likewise an RJ45 connector or similar connector 144 is provided at the opposite end where electrical-mechanical connection is made with the appliance and particularly with an appliance microprocessor or controller 150. The extended length of the cable, and namely the spare wire in the cable on the order of six feet (6') for example) serves as a desired random length conductive antenna that is external to the appliance. Moreover, the connectors 142 with the DSM module and connectors 144 with the appliance assure that the signal will reach the microprocessor/controller on the printed circuit board 120 of the module and be effectively conveyed to the appliance microprocessor/controller 150. Additionally, switch 152 is schematically represented as part of the DSM module so that the homeowner has the capability to switch the radio 122 of the module between the internal printed circuit board antenna 124 and the external antenna provided by the extra wire in cable 140.

Figure 2:
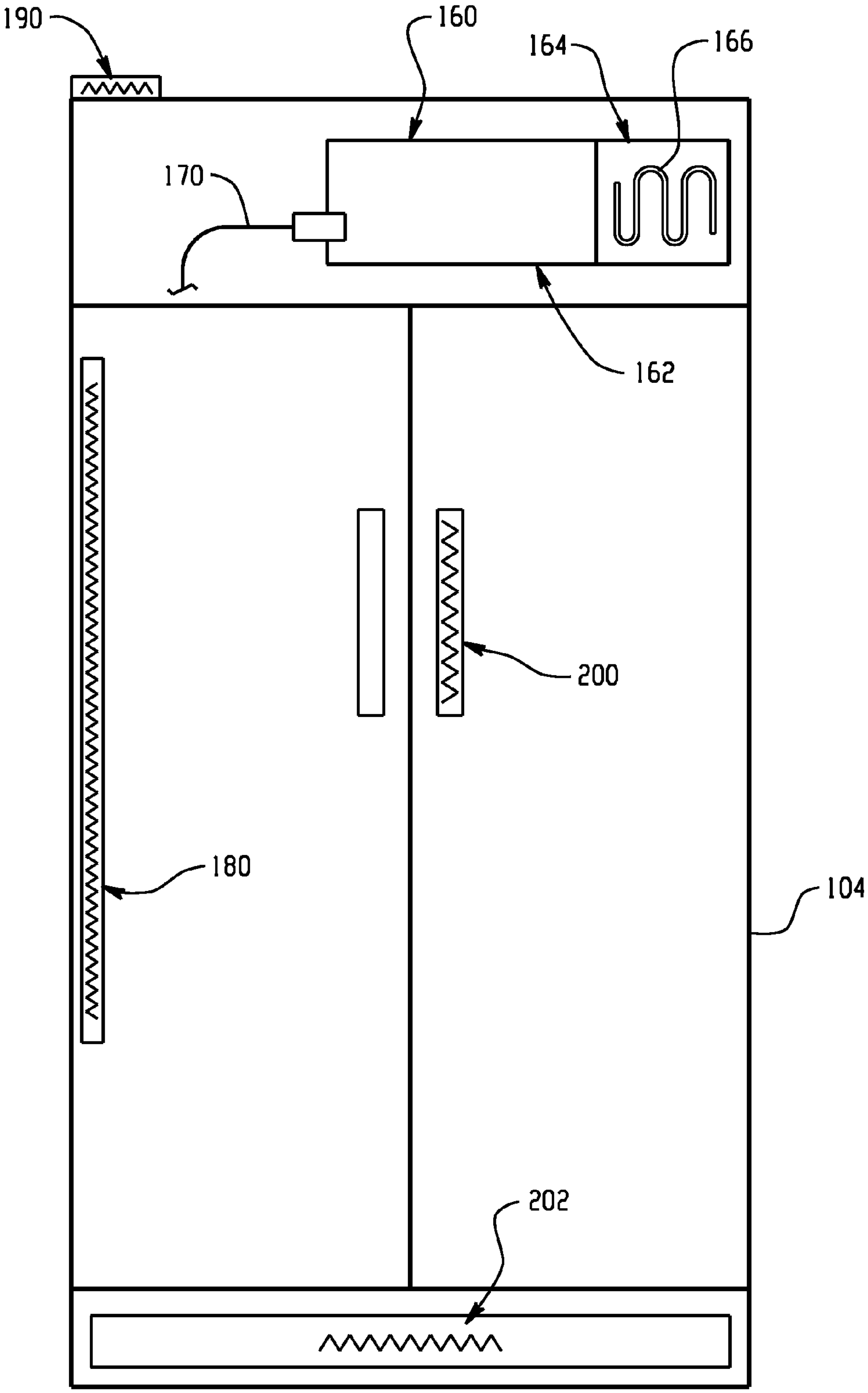
FIG. 2 is schematic representation of an appliance with various representations of an antenna incorporated into an appliance.
Figure 3:
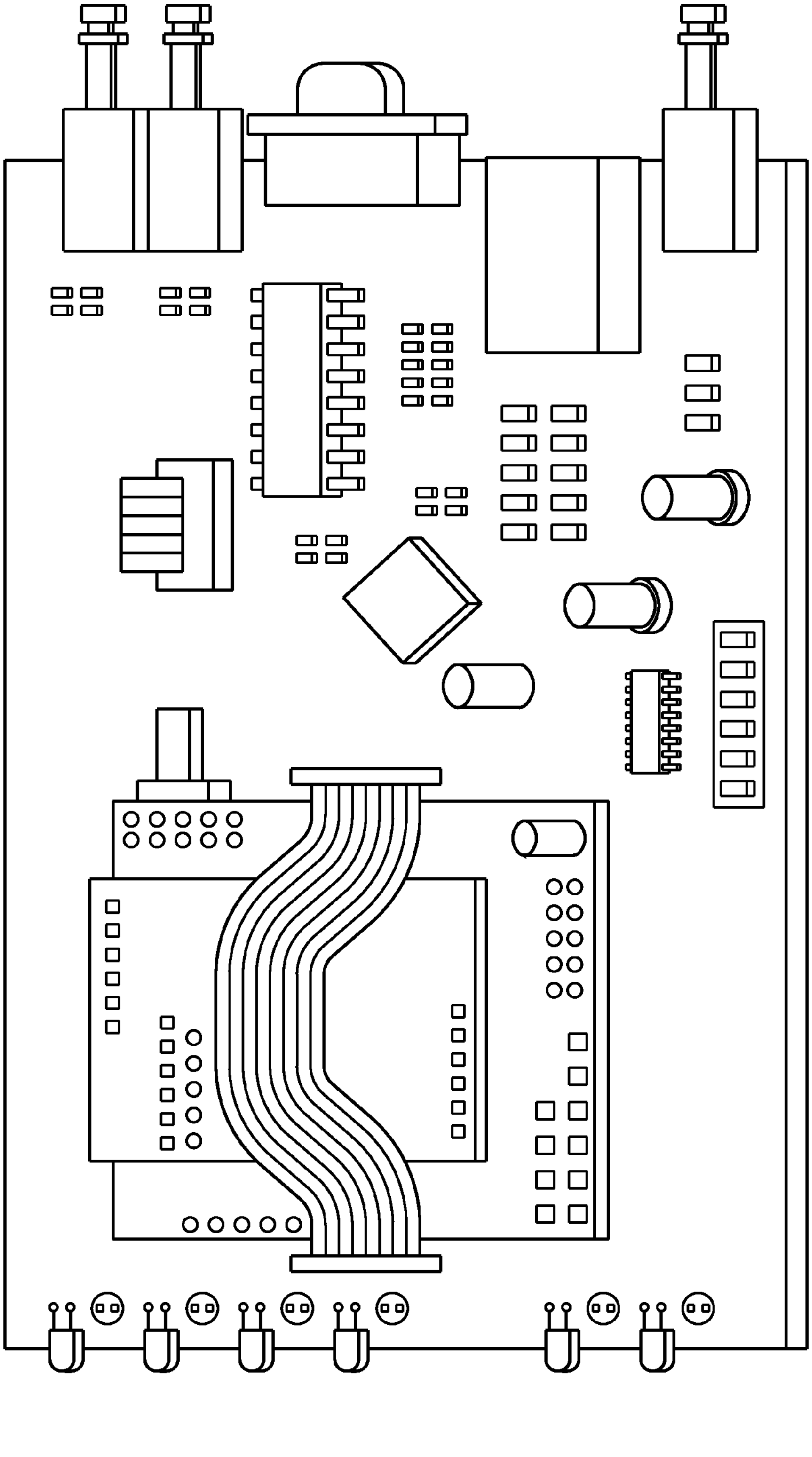
FIG. 3 is a perspective view of a printed circuit board that serves as an integrated demand supply module and appliance controller for a home appliance.

FIG. 2 is a schematic representation of another embodiment or alternate system 100 where the demand supply management module 102 of the embodiment of FIG. 1 has been integrated into the home appliance 104. As shown here, the appliance 104 is a refrigerator-freezer and the appliance microprocessor/controller is integrated into a radio having an on-board printed circuit board (PCB) antenna. This integrated structure 160 is generally identified by reference numeral 160. Thus, the appliance microprocessor/controller 162 is intended to control various operative functions of the appliance. The radio 164 is operatively connected to the appliance controller and includes an onboard PCB antenna 166. If sufficient signal reception is available, then the demand response signal is received by the individual home appliance and the homeowner can elect to alter the operation of the associated appliance, or the homeowner may have previously chosen one or more desired responses for home appliances that are tied into the network to operate in a preselected manner.

As noted above, there are times where it is necessary to employ an external antenna because either the pigtail or PCB antenna residing within the on-board radio is insufficient. Thus, a coaxial lead 170 extends from the appliance controller/radio 160. A terminal end of the coaxial lead is routed to a remote antenna of choice. The following are exemplary locations for such an antenna where the appliance aesthetics are not compromised. For example, lead 170 may be connected to or become a portion of a remote antenna that is incorporated into or becomes a part of gasket 180, for example, associated with sealing the door to the cabinet of the home appliance. Such an antenna location is desirable since the door may have an extended length and thus the antenna, in turn, can likewise have an extended length and also be situated along a peripheral portion of the appliance to maximize the potential operative communication with the signal.

An alternative antenna location incorporates an antenna 190 in a hinge or hinge cover of the appliance. As illustrated in FIG. 2, at least one hinge cover is located along an upper portion of the appliance which can be helpful in maximizing the potential for receipt of the signal.

Another possible location for an antenna 200 is to incorporate the antenna in a handle of the appliance. For example, in an elongated handle as used in a refrigerator-freezer, the antenna can likewise have an extended length, and also be advantageously located along a perimeter region of the home appliance. This maximizes possible receipt of the demand response signal so that the appliance through the microprocessor/controller 162 can change its operation if needed.

Antenna 202 is representative of yet another location disposed along the grill of the appliance, such as a base grill along the lower edge of the appliance. This location of the antenna permits the antenna to have an elongated length while having a low potential impact on the aesthetics of the appliance.

As will be appreciated, a wide variety of locations could be alternatively adopted. If the home appliance is a refrigerator, in addition to those enumerated above, the antenna may be insert molded into other plastic components, or silk screened as a conductive trace over a painted area. The conductive paint is a possible option along with incorporating the antenna into flanges, a case top, case sides, access covers, dispenser recesses, etc. The antenna could be a long wire-type of antenna and could adopt one of many types of designed such as a Marconi, dipole, or other designs that are typical in radiofrequency receivers or transmitters. Alternatively, the add-on antenna could rotate, translate, or otherwise be moved to optimize reception by taking advantage of directionality. The add-on design could also be a "rubber duck" style antenna that is commonly used in FM radio transceivers where a short rubber or plastic coated antenna with an internal spiral or straight conductor extends from the appliance and still provides adequate protection to the antenna incased therein. This could be attached to a metal back wall and rotated vertically or otherwise at installation in order to optimize the reception.

In a range, many of the same antenna types and locations for an antenna as described with respect to the refrigerator would also apply. For example, incorporating the antenna into the backsplash portion of the range where it could be silk screened, adhesively attached, over molded, insert molded, painted with a conductive paint, etc. or attached to any metal panel as described in the refrigerator are all reasonable alternatives that maximize potential reception and also have a low impact on the aesthetics of the appliance. The antenna could also be a flying lead or dipole design that is either suspended or specifically routed along a bottom of the range.

The smaller size of the microwave oven still provides suitable alternative locations as found in the appliances enumerated above. More particularly, locating the antenna in the grill, handle, above the cabinet, or beneath decorative overlays, along with building into the glass window all provide reasonable alternatives.

In the home laundry, the backsplash is again a desired location where the antenna could be silk screened, adhesively attached, over molded, insert molded, provided as a conductive paint, etc. , or incorporated or attached to any metal panel as described above. Suspending the antenna from a bottom portion of the laundry product could also be an effective antenna location. Fill hoses or vent plumbing associated with the clothes washer or dryer are alternatives that are specific to these home appliances.

Those alternative locations identified above could also apply to a dishwasher. The backsplash, control panel, or any decorative overlay may serve as ideal aesthetic locations on the dishwasher. In a manner similar to the home laundry appliances, the antenna could also be incorporated under the exterior of a drain hose or along a fill line. Likewise, the antenna could be incorporated into an insulation blanket that is often surrounding the dishwasher, or adhesively attached to a cabinet sidewall, back wall, etc.

Relative to a water heater, many of the same comments identified above would be fully applicable. For example, the antenna could be part of the outer wrapper of the water heater, or adhesively attached to inlet or outlet water lines even if a standoff arrangement is required. Likewise, an antenna could be incorporated at a bottom of the heater using various designs. The "rubber duck" concept to be incorporated during assembly in the factory to provide a Marconi design that emerges from an external surface of the water heater, i.e., top surface, sidewall, bottom, etc. On those water heater designs that incorporate plastic components, it is envisioned that the antenna could be easily incorporated into such components.

Still another exemplary home appliance is a window air conditioner. Once again, many of the proposed antenna designs and locations enumerated above would apply to this particular home appliance and are distinct possibilities, although not repeated here for purposes of brevity. For example, the antenna could be located inside the unit or along the outside of the unit for external triggered signals. The antenna could be incorporated into an outer wrapper of the air conditioner, or can be a flying lead or dipole design suspended or routed inside the unit behind the plastic faceplates. Alternatively, the antenna could be located in the grill, beneath decorative overlays, built into the control knobs, louvers, or into the evaporator or condenser via isolated, insulated fins within the coil.

The antenna can adopt a wide variety of configurations and be located in a variety of locations of the home appliance without adversely impacting the aesthetics of the appliance, e.g., a wall panel of the home appliance, a gasket, a hinge or a hinge cover of the home appliance, an inside of a housing of the home appliance and the antenna passes through the housing to the external surface of the associated home appliance, grill of the home appliance, a backsplash of the home appliance, a handle of the home appliance, a decorative overlay of the home appliance, an insulation blanket of the home appliance, at least partially incorporated within or onto a window of the appliance, a supply line or drain hose, in a decorative overlay, silk-screened or incorporated into a conductive paint, or a free-formed shape routed below, behind, or adjacent to the appliance.

Although as described above, many of the antennas could be long wire-type antennas or smaller, more compact antennas that may be in addition to the internal printed circuit board type of antenna, it will also be appreciated that multiple antenna concepts could be employed in unison in order to optimize reception. Thus, although switch 152 shown in FIG. 1 suggests that the homeowner could switch between an internal printed circuit board type of antenna and an external antenna, there may also be instances where more than one external antenna is used and/or one or more external antennas could be used in conjunction with the internal antenna. Circuitry could be incorporated into the radio to select from multiple antenna inputs based on the peak signal strength.

Because the networked arrangement typically has such a limited power output, an efficient antenna design incorporated into an appliance in a manner that is unobtrusive and does not adversely impact the aesthetics would significantly enhance operation and effectively receive demand supply signals. In the absence of an effective antenna design, a load shed signal for example could go unheeded. The specifics of the antenna design should be inclusive of all anticipated frequencies including Zigbee, Wimax, RF broadcast, pager, etc., over a wide range of transmission frequencies. Physical shapes and lengths of the antenna will vary depending on the frequency at hand. A tuning circuit and a matching network can be associated with the radio to optimally couple the antenna to the radio. The antenna may be comprised of an array of driven and parasitic elements to provide directionality to the system where driven and parasitic elements would include director and reflector elements, respectively. It is contemplated that the array is tunable through an active control network within a microchip of the radio to optimize performance. Additionally, this array could be bonded to an adhesive appliqué to allow the homeowner to orient the antenna for optimal reception prior to affixing the array to the appliance. Part and parcel of such arrangements may be the inclusion of an indicator that exhibits relative strength of an incoming signal. This would permit the homeowner or appliance installer to tune the antenna or directionally position the antenna to maximize the reception. Further, the indicator may provide acknowledgement of receipt of valid authenticated packets. That is, the radio can be configured to determine if a number of packets are being received and thereby confirm receipt of the intelligence that is incorporated into the packets.

Similar considerations are associated with external antennas for a home energy manager, or any other gateway that might be receiving or transmitting traffic to and from any head end system. For example, incorporating an antenna into or on a housing of the HEM, gateway, or a thermostat is envisioned in much the same manner as described above. A coaxial connector might be used to connect another antenna external of the device if so desired, although it is also contemplated that a random wire or long wire can be brought into the housing and tuned without a coaxial connector.

In a manner similar to the antenna described with respect to the various home appliances, the antenna can adopt a wide variety of configurations and be located in a variety of locations of the home energy manager or gateway without adversely impacting the aesthetics thereof, e.g., a wall panel of the housing, a gasket, a hinge or a hinge cover, an inside of a housing with the antenna passing through the housing to the external surface, in a decorative overlay, at least partially incorporated within or onto a display window, silk-screened or incorporated into a conductive paint, or a free-form shape routed below, behind, or adjacent thereto.

The disclosure has been described with respect to preferred embodiments. Obviously, modifications and alterations may be contemplated by one skilled in the art, and the subject disclosure should not be limited to the particular examples described above but instead through the following claims.

What is claimed is:

1. A home appliance antenna assembly for communicating between an associated home energy manager and an associated appliance controller to control operation of an associated home appliance comprising:

- a home appliance including one of a refrigerator, range, microwave oven, clothes washer, dishwasher, hot water heater, and window air conditioner;
- a microprocessor integral to the appliance for controlling the appliance;
- a demand response module operatively connected to the home appliance microprocessor;
- a radio integrated into one of the appliance microprocessor and the demand response module; and
- an antenna integrated into the home appliance and extending from one of the demand response module and the appliance microprocessor, at least a portion of the antenna located along an external surface of the home appliance adapted for RF communication with the associated home energy manager; and
- a tuning circuit and matching network operatively associated with the radio to couple the antenna to the radio.

2. The home antenna assembly of claim 1 wherein the demand response module further includes an indicator that exhibits relative strength of an incoming radio signal.

3. The home antenna assembly of claim 2 wherein the indicator further indicates receipt of valid authenticated packets.

4. The home appliance antenna assembly of claim 1 wherein the radio includes one of a transceiver, transmitter, and receiver.

5. The home appliance antenna assembly of claim 1 wherein the demand response module is external to the associated home appliance, and further comprising a multi-wire cable that interconnects the associated home appliance with the external demand response module and wherein the antenna includes a spare wire in the multi-wire cable.

6. The home appliance antenna assembly of claim 1 further comprising an antenna operatively associated with the home appliance that is tuned to a wavelength of the radio.

7. The home appliance antenna assembly of claim 1 wherein the antenna is one of:

- (i) located at one of the following locations relative to the appliance:
  - a wall panel of the home appliance,
  - one of a hinge and hinge cover of the home appliance,
  - an inside of a housing of the home appliance and the antenna passes through the housing to the external surface of the associated home appliance,
  - a grill of the home appliance,
  - a gasket of the home appliance;
  - a backsplash of the home appliance,
  - a handle of the home appliance,
  - a decorative overlay of the home appliance,
  - an insulation blanket of the home appliance;
- (ii) at least partially incorporated within or onto a window of the appliance; and
- (iii) a free-form shape routed below, behind, or adjacent to the appliance.

8. The home appliance antenna assembly of claim 1 wherein the antenna is a conductive material that is applied to an outer surface of the appliance.

9. The home appliance antenna assembly of claim 1 wherein the antenna is an array of driven and parasitic elements to provide directionality.

10. The home appliance antenna assembly of claim 9 wherein the driven and parasitic elements are director and reflector elements, respectively.

11. The home appliance antenna assembly of claim 9 wherein the array is operatively associated with an appliqu éthat is bonded or otherwise attached to an outer surface of the appliance in an oriented fashion to optimize the directionality.

12. The home appliance antenna assembly of claim 9 wherein the array is directly applied to an outer surface of the appliance using a conductive layer.

13. The home appliance antenna assembly of claim 12 wherein the conductive layer is one of a film and paint.

14. The home appliance antenna assembly of claim 9 wherein the array is tunable through an active control network within a microchip of the radio to optimize performance.

15. A method of communicating between a home appliance and a home energy manager comprising:

- providing a demand response module with a home appliance;
- providing a controller for the home appliance that communicates with the demand response module;
- mounting an antenna along an external surface or component of the home appliance;
- providing a matching network operatively associated with a radio to couple the antenna to the radio; and
- coupling the antenna to the radio (a) residing within the demand response module or (b) incorporated directly in a controller of the home appliance.

16. The method of claim 15 further indicating a relative strength of an incoming radio signal.

17. The method of claim 15 further indicating receipt of valid authenticated packets.

18. The method of claim 15 further providing an array of driven and parasitic elements to provide directionality to the antenna.

19. The method of claim 15 wherein the mounting step includes incorporating the antenna in a conductive layer of the home appliance.

20. The method of claim 15 wherein the coupling step includes using a spare wire of a connector cable as a long-wire antenna between an externally mounted demand response module and the controller mounted in the home appliance.

21. An antenna assembly for communicating between a head end system and a home energy manager or gateway comprising:

a radio integrated into the home energy manager or gateway; and an antenna extending therefrom, at least a portion of the antenna located along an external surface thereof for RF communication with the associated head end system; and a tuning circuit and matching network operatively associated with the radio to couple the antenna to the radio.

* * * * *

UNITED STATES PATENT AND TRADEMARK OFFICE

CERTIFICATE OF CORRECTION

PATENT NO. : 8,526,935 B2
APPLICATION NO. : 12/637917
DATED : September 3, 2013
INVENTOR(S) : Besore et al.

It is certified that error appears in the above-identified patent and that said Letters Patent is hereby corrected as shown below:

In the Specification

Column 3, Lines 30-31, delete “modules” and insert -- modules. --, therefor.

Column 3, Line 60, delete “CATS” and insert -- CAT5 --, therefor.

Column 6, Line 30, delete “free-formed” and insert -- free-form --, therefor.

In the Claims

Column 7, Line 59, in Claim 2, delete “home” and insert -- home appliance --, therefor.

Column 7, Line 62, in Claim 3, delete “home” and insert -- home appliance --, therefor.

Column 8, Lines 40-41, in Claim 11, delete “appliqu ethat” and insert -- appliqué that --, therefor.

Signed and Sealed this
Eleventh Day of February, 2014

Michelle K. Lee

Michelle K. Lee
*Deputy Director of the United States Patent and Trademark Office*